United States Patent [19]

Nozaki et al.

[11] Patent Number: 5,269,101
[45] Date of Patent: Dec. 14, 1993

[54] AUTOMOTIVE WEATHERSTRIP

[75] Inventors: Masahiro Nozaki; Masahiro Koide, both of Inazawa, Japan

[73] Assignee: Toyoda Gosei Co., Ltd., Nishikasugi, Japan

[21] Appl. No.: 25,735

[22] Filed: Mar. 3, 1993

Related U.S. Application Data

[63] Continuation of Ser. No. 915,607, Jul. 21, 1992, abandoned.

[30] Foreign Application Priority Data

Jul. 29, 1991 [JP] Japan .................................. 3-212834

[51] Int. Cl.⁵ ............................................... E06B 7/16
[52] U.S. Cl. .................................. 49/479.1; 49/490.1; 49/498.1; 49/506
[58] Field of Search ................ 49/479.1, 490.1, 498.1, 49/475.1, 506

[56] References Cited

U.S. PATENT DOCUMENTS 4,769,947  9/1988  Ogawa et al. .
4,884,370  12/1989  Nozaki et al. .
4,928,431  5/1990  Kuzuhara et al. ............ 49/479
4,986,947  1/1991  Shigeki et al. .

FOREIGN PATENT DOCUMENTS 1488272  10/1977  United Kingdom .
1544420  4/1979  United Kingdom .

*Primary Examiner*—Philip C. Kannan
*Attorney, Agent, or Firm*—Cushman, Darby & Cushman

[57] ABSTRACT

An automotive weatherstrip mounted along a peripheral flange of a door opening of an automobile is provided. The weatherstrip includes a trim part having a generally U-shaped cross-section to be held by a peripheral flange of the door opening and a hollow seal part for contacting a peripheral edge of a door, protruding generally perpendicular from one side of said trim part. The trim part, at a corner portion of the peripheral flange of the door opening, is curvedly formed by cutting away a portion of the hollow seal part. A molded hollow seal part, at the corner portion, is integrally molded with the trim part and has an outer configuration substantially similar to that of the hollow seal part. The molded hollow seal part is circumferentially offset from the curved trim part so as to extend along an upper side and a vertical side of the door opening. A generally triangular covering part is provided to cover a side surface of the trim part from which the hollow seal part is cut away and is integrally molded with the molded hollow seal part.

7 Claims, 3 Drawing Sheets

AUTOMOTIVE WEATHERSTRIP

This is a continuation of application Ser. No. 07/915,607, filed on July 21, 1992, which was abandoned upon the filing hereof.

BACKGROUND OF THE INVENTION

1. Field of the Invention

The present invention relates to an automotive weatherstrip and more particularly to a configuration of a corner portion of a door weatherstrip mounted along a peripheral flange of a door opening of an automobile to seal the door and the peripheral edge of the door opening.

2. Description of Related Art

The prior art utilizes an extruded member as a weatherstrip 1 mounted along the peripheral edge of a door opening of a general automobile as shown in FIG. 1. The weatherstrip 1 includes a trim part 11 a cross-section of which is generally U-shaped to be held by a peripheral flange 30 (FIG. 4) of a door opening, a hollow seal part 12 protruding perpendicularly from one side of the trim part 11 and being pressed upon by a peripheral edge of a door 20, and a body seal lip 13 formed in a manner such that an edge of an opening side of the trim part 11 engages with the flange 30 side of the peripheral edge of the door opening, as shown in FIG. 6.

However, when the extruded member is bent along the corner portion C (FIG. 1) of the peripheral flange 30 of the door opening, the seal part 12 is irregularly deformed which causes the peripheral edge of the door 20 to have a low quality seal. Therefore, in this corner portion C, a molded member 1C is formed which connects the extruded members. As shown in FIG. 6, this connection is generally performed by placing ends 1A and 1B of each extruded members so that they meet at a substantial right angle, mounting the extruded member in the cavity of a mold wherein a core for molding a molded hollow seal part 52 is also mounted, and injecting molding materials into the cavity. After the completion of the molding, the core is pulled out. Therefore, an inevitable aperture 2 is present, through which the core is pulled out from the molded hollow seal part 52 of the molded member 1C. In the prior art, the aperture 2 is located in the inner-diameter-side of the curvature of the corner portion, and the opening of the aperture 2 must be bonded by an adhesive to close it, after the completion of the molding.

However, regarding the weatherstrip 1, when the aperture 2 for the core is closed, a sectional area of the molded hollow seal part 52 of the molded member 1C is reduced by an amount equal to the width of the aperture 2. Thus, due to the reduced sealing area, low quality seal results.

In addition, as the molded hollow seal part 52 of the molded member 1C is formed to protrude generally perpendicular from one side of the trim part and is formed with the same radius as that of the curvature of the flange 30 of the body panel, the molded hollow seal part 52 does not correspond to a shape of the corner portion having a generally right angled corner at the peripheral edge of the door, which causes a low quality seal between the seal part and the corner portion of the door.

SUMMARY OF THE INVENTION

An object of the invention is to provide an automotive weatherstrip capable of overcoming the drawbacks of the related art and exhibiting a high quality seal between a molded hollow seal part at a corner of a door opening and a peripheral edge of a door.

An automotive weatherstrip mounted along a peripheral flange of a door opening of an automobile and formed by an extrusion according to the invention comprises a trim part having a generally U-shaped cross-section to be held by the peripheral flange of the door opening and a hollow seal part which contacts a peripheral edge of a door, protruding generally perpendicular from one side of the trim part. The trim part is curvedly formed at a corner portion of the peripheral flange of the door opening by cutting away a portion of the hollow seal part so as to be held on a curved flange of the door opening. A molded hollow seal part, disposed at the corner portion, is integrally molded with the trim part of the extrusion and has an outer configuration substantially similar to that of the hollow seal part. The molded hollow seal part is circumferentially offset from the curved trim part so as to extend along an upper side and a vertical side of the correspondingly peripheral edge of the door. A generally triangular covering part is provided to cover a side surface of the trim part from which the hollow seal part is cut away and is integrally molded with the molded hollow seal part.

The automotive weatherstrip of the present invention does not have an aperture in the molded hollow seal part through which the core is pulled out. Therefore, the sectional area of the molded hollow seal part will not reduce in size and the sealing area will not become smaller to impair the quality of sealing. Furthermore, the molded hollow seal part to be pressed by the door is formed to correspond to the corner portion of the door having a substantially right angled peripheral edge, which successfully provides a wider sealing area of the seal part upon which the peripheral edge of the door presses.

Other objects and features of the present invention will become apparent by reference to the following drawings wherein the same reference numbers are used for those parts of a weatherstrip according to the present invention and the related art which are identical.

DESCRIPTION OF THE PREFERRED EMBODIMENTS

Figure 1:
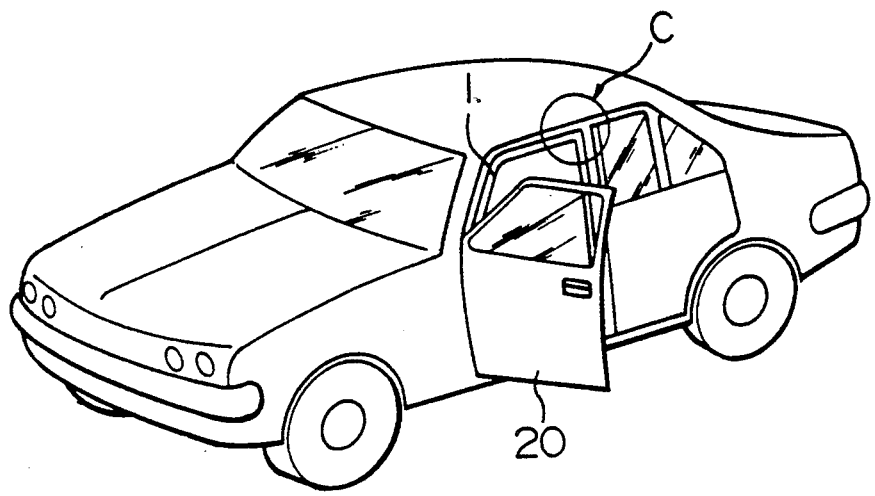
FIG. 1 is a perspective view of a conventional automobile to which, a weatherstrip according to the present invention, may be mounted on a door portion thereof.
Figure 2:
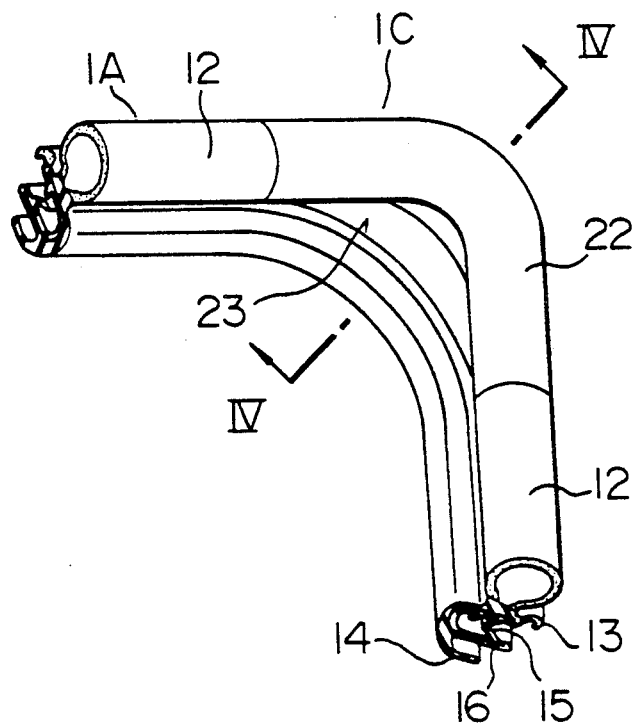
FIG. 2 is a perspective view of an outer side of a corner portion of a weatherstrip provided in accordance with the principles of the present invention.
Figure 3:
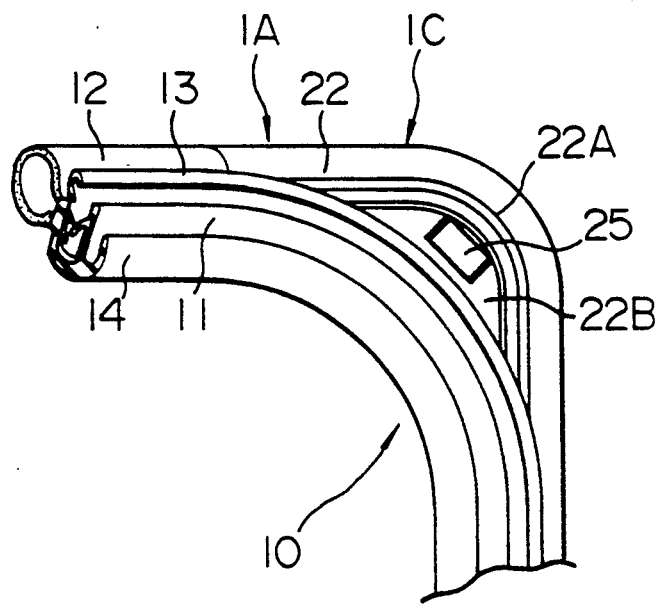
FIG. 3 is a perspective view of an inner side of a corner portion of the weatherstrip of the present invention.
Figure 4:
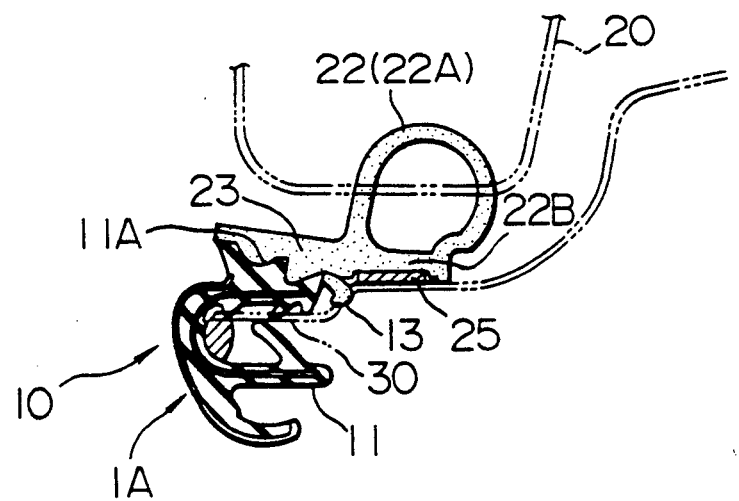
FIG. 4 is a sectional view taken along line IV—IV in FIG. 2 showing the weatherstrip mounted on a peripheral edge of a door opening.

At a corner portion C, a weatherstrip 10 which is to be mounted along a peripheral flange 30 (FIG. 4) of a door opening of an automobile, as shown in FIG. 1, includes a trim part 11, a cross-section of which is generally U-shaped; an extruded member 1A having a portion of seal part 12 cut away and curved as illustrated in FIGS. 2 to 5; a molded hollow seal part 22 having a generally round and hollow cross-section, provided at a position circumferentially offset from the trim part 11, and bent to conform with a corner portion of a door 20 having a substantially, right angled peripheral portion; and a generally triangular covering part 23 which covers a cut surface 11A of the extruded hollow seal part 12 located on a side of the trim part 11 and integrally molded with the molded hollow seal part 22. Accordingly, as shown in FIG. 2, the corner portion of the weatherstrip 10 comprises the extruded member 1A for mounting the trim part 11 on a peripheral flange 30 of a body panel and molded member 1C defining the remaining part of the corner portion.

The extruded member 1A includes, in the same manner as the prior art, the trim part 11 having a generally U-shaped cross-section; the hollow seal part 12 having a generally round and hollow cross-section and protruding in a substantially perpendicular direction from one side (the outer side of the body panel) of the trim part 11 whereon the pressure of a peripheral portion of a door 20 is applied; a body seal lip 13; a lip 14 which protrudes from the inner side of the body into the outer side of the body on the trim part 11 and covers an end part of interior members which is not shown in the appended figures; and flange-holding lips 15 formed inside of the trim part 11. A reinforcing insert 16 is embedded in the trim part 11 and decorative fabrics are adhered to outer surfaces of the trim part 11 and the lip 14.

Figure 5:
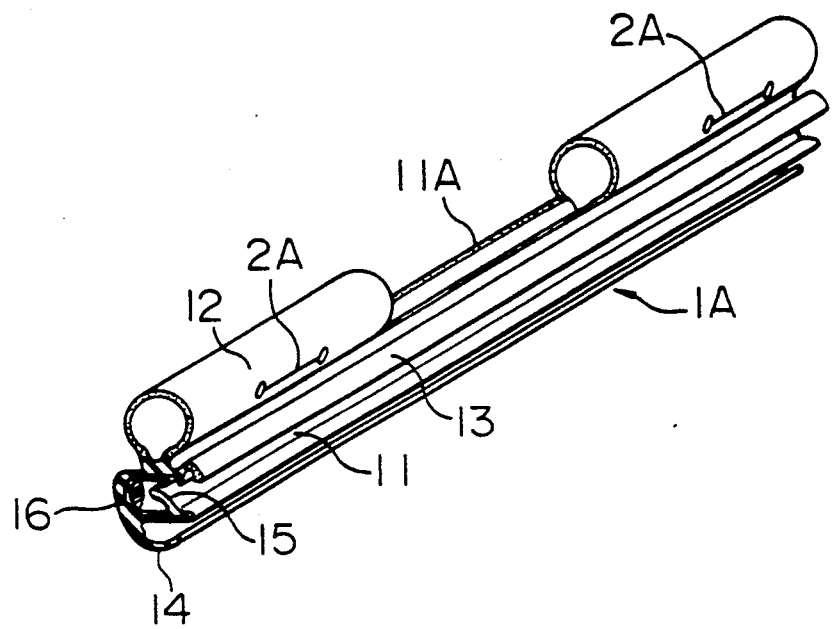
FIG. 5 is a perspective view illustrating the weatherstrip according to the present invention of which a seal part of an extruded member has been cut during the manufacturing of the weatherstrip.
Figure 6:
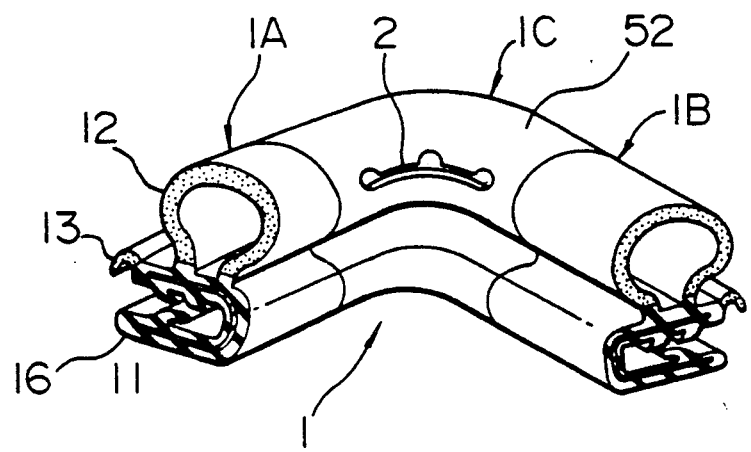
FIG. 6 is a partly sectioned perspective view of a corner portion of a weatherstrip of the prior art.

The following is a description of a manufacturing method for the corner portion of the weatherstrip 10. In the first place, a portion of the hollow seal part 12 is cut away from the extruded member 1A as shown in FIG. 5. Then, the trim part 11 with cut seal part 12 is bent in accordance with a radius of curvature of a peripheral flange 30 of the body panel and mounted in a predetermined position of a mold cavity. The cavity for molding the molded hollow seal part 22 is formed by a concave having generally the same outer configuration as that of the hollow seal part 12 of the extruded member 1A, extending in each direction along the upper side and vertical side of the door opening enabling these two cavity lines to meet at a position peripheral to the bent trim part 11. Accordingly, these cavity lines meet and form a curvature of a substantial right angle corresponding to the shape of the corner portion of the peripheral edge of the door 20. A generally triangular concave for molding the covering part 23 to cover the cut portion 11A of the seal part 12 on the side of the trim part 11 of the extruded member, 1A is formed in the cavity.

A core for molding the molded hollow seal part 22 is inserted through slits 2A provided at the hollow seal parts 12 of the extruded member 1A, and then pulled out therefrom. A molded part 1C having the molded hollow seal part 22 and the covering part 23 is made by placing the above mentioned core in the predetermined position of the cavity of the mold and then by injecting molding materials into the cavity. After completing the molding, the molded part 1C is taken out from the cavity and the core is pulled out through the slits 2A, thus completing the corner portion.

The molded hollow seal part 22 molded in the above manner does not have an aperture 2, which is provided in the conventional molded hollow seal part 52, for pulling the core therefrom. Therefore, a section of the molded hollow seal part 22 cannot be reduced after molding, and a high quality seal is maintained. Although slits 2A, through which the core is pulled out, are provided in the hollow seal part 12 of the extruded member 1A, a section of the hollow seal part 12 will normally keep its originally extruded shape and will not reduce in size since the extruded member 1A is provided with the slits 2A after the extrusion of member 1A. The slits 2A are opened only when the core is being inserted therein and pulled out therefrom.

The molded hollow seal part 22 is bent at a position circumferentially offset from the trim part 11 corresponding to a configuration of a peripheral edge of the door 20, which presses on the molded hollow seal part 22. The lower surface of a flange side 22B which is also a portion of an offset part 22A of the molded hollow seal part 22, forms a fixed face generally parallel to the side of the peripheral flange 30 of the body panel. A pressure sensitive adhesive double coated tape 25 is applied to the fixed face to secure the offset part 22A of the molded hollow seal part 22 onto the flange 30. The offset part 22A cannot slide or be tucked up and therefore, high quality seal in the peripheral edge of the door 20 is obtained since the molded hollow seal part 22 of the present invention has a wider sealing area than that of the prior art. Instead of the pressure sensitive adhesive double coated tape 25, a bonding agent or an adhesive can also be used for fixing the molded hollow seal part 22 on the fixed surface 22B.

In the molding process, the generally triangular covering part 23, which covers the cut face 11A of the hollow seal part 12 located on the side of the trim part 11 of the extruded member 1A, is molded in one unit with the trim part 11. Therefore, the appearance of the trim part 11 will not be impaired. In addition, because the covering part 23 functions to detain a restoring force of the bent trim part 11, the curvature of the trim part 11 is maintained. Thus, the weatherstrip 10 can be mounted in a predetermined position.

The automotive weatherstrip of the present invention does not have the aperture in the molded hollow seal part through which the core is pulled out. Therefore, the section of the molded hollow seal part will not reduce in size and the sealing area thereof will not become smaller to impair the sealing quality.

The molded hollow seal part, upon which the door is to be pressed, is formed to correspond to the corner portion of the door with a substantially right angled peripheral edge. Namely, the outer configuration of the molded hollow seal part is generally the same as the hollow seal part of the extruded member having the hollow section. The molded hollow seal part extends in each direction along the upper side and vertical side of the door opening and is bent at a position circumferentially offset from the trim part of the bent extruded member. The above features provide the molded hollow seal part with a wider sealing area, whereon the peripheral edge of the door is pressed.

Furthermore, in the molding process, the generally triangular covering part, which covers the cut surface of the hollow seal part located on the side of the trim part of the extruded member, is molded in one unit with the trim part. Therefore, the appearance of the trim part will not be impaired. In addition, because the covering part functions to detain a restoring force of the bent trim part, the curvature of the trim part is maintained. Thus, the weatherstrip can be mounted in a predetermined position.

What is claimed is:

1. An automotive weatherstrip mounted along a peripheral flange of a door opening of an automobile comprising:
   an extruded trim part having a generally U-shaped cross-section held by a peripheral flange of the door opening;
   a hollow seal part protruding from one side of said trim part, contacting a peripheral edge of a door, said trim part being curvedly formed at a corner portion of said peripheral flange of said door opening, by cutting away a portion of said hollow seal part, said corner portion being held on a curved flange of said door opening;
   a molded hollow seal part, being integrally molded with said trim part defining said corner portion, said molded hollow seal part having an outer configuration substantially similar to that of said hollow seal part, said molded hollow seal part being circumferentially offset from said curved trim part so as to extend along an upper side and a vertical side of said door opening; and
   a generally triangular part covering a side surface of said trim part from which said portion of said hollow seal part is cut away, said triangular part being integrally molded with said molded hollow seal part.

2. An automotive weatherstrip according to claim 1, wherein said trim part includes a reinforcing insert.

3. An automotive weatherstrip according to claim 1, wherein slits are formed on said hollow seal part near said molded hollow seal part, said slits utilized to remove molding cores.

4. An automotive weatherstrip according to claim 1, wherein a lower surface of said offset molded hollow seal part is made to be parallel with a body panel of the automobile.

5. An automotive weatherstrip according to claim 4, wherein said lower surface includes means for bonding said offset portion to the body panel.

6. An automotive weatherstrip according to claim 5, wherein said bonding means comprises one of a pressure sensitive double coated adhesive tape and a bonding agent.

7. A method of forming an automotive weatherstrip for mounting along a peripheral flange of a door opening of an automobile comprising the steps of:
   extruding a trim part having a generally U-shaped cross-section;
   co-extruding a hollow seal part with said trim part integrally so as to protrude from one side of said trim part;
   cutting away a portion of said hollow seal part from said part;
   bending said trim part where said portion of said hollow seal part has been cut away according to a corner portion of said peripheral flange of said door opening;
   integrally molding a molded hollow seal part with said trim part where said portion of said hollow seal part has been cut away so as to form a corner portion of the weatherstrip, said molded hollow seal part having an outer configuration substantially similar to that of said hollow seal part, said molded hollow seal part being circumferentially offset from the bent trim part so as to extend along an upper side and a vertical side of said door opening; and
   integrally molding a generally triangular part with said molded hollow seal part so as to cover a side surface of said bent trim part from which said hollow seal part has been cut away.

* * * * *